United States Patent
Lee et al.

(10) Patent No.: US 10,065,578 B2
(45) Date of Patent: Sep. 4, 2018

(54) DOOR TRIM COUPLING DEVICE FOR A VEHICLE

(71) Applicants: Hyundai Motor Company, Seoul (KR); Kia Motors Corporation, Seoul (KR); Duck Yang Industry Co., Ltd., Ulsan (KR)

(72) Inventors: Jaeseung Lee, Hwaseong-si (KR); Sun gu Lee, Suwon-si (KR); Sae Hoon Oh, Ulsan (KR); Hun Sub Jeong, Ulsan (KR); sueng ho Kim, Ulsan (KR)

(73) Assignees: Hyundai Motor Company, Seoul (KR); Kia Motors Corporation, Seoul (KR); Duck Yang Industry Co., Ltd., Ulsan (KR)

( * ) Notice: Subject to any disclaimer, the term of this patent is extended or adjusted under 35 U.S.C. 154(b) by 0 days.

(21) Appl. No.: 15/604,423

(22) Filed: May 24, 2017

(65) Prior Publication Data
US 2018/0170282 A1 Jun. 21, 2018

(30) Foreign Application Priority Data
Dec. 16, 2016 (KR) .......................... 10-2016-0172939

(51) Int. Cl.
*B60R 13/00* (2006.01)
*B60R 13/02* (2006.01)

(52) U.S. Cl.
CPC ...... *B60R 13/0206* (2013.01); *B60R 13/0243* (2013.01); *B60R 13/0275* (2013.01)

(58) Field of Classification Search
CPC ............ B60R 13/0206; B60R 13/0243; B60R 13/0275
See application file for complete search history.

(56) References Cited

U.S. PATENT DOCUMENTS

| | | |
|---|---|---|
| 6,289,558 B1 | 9/2001 | Hammerslag |
| 7,591,050 B2 | 9/2009 | Hammerslag |
| 7,950,112 B2 | 5/2011 | Hammerslag et al. |
| 7,954,204 B2 | 6/2011 | Hammerslag et al. |
| 7,992,261 B2 | 8/2011 | Hammerslag et al. |
| 8,091,182 B2 | 1/2012 | Hammerslag et al. |

(Continued)

FOREIGN PATENT DOCUMENTS

KR  10-1575508 B1  12/2015

OTHER PUBLICATIONS

US 7,516,521, 04/2009, Hammerslag (withdrawn)

*Primary Examiner* — David M Upchurch
(74) *Attorney, Agent, or Firm* — Morgan, Lewis & Bockius LLP

(57) ABSTRACT

A door trim coupling device for a vehicle with improved assemblability and detachability may include a wire provided in a closed loop form, a locking device disposed in a door trim of the vehicle, the locking device being provided to selectively wind or unwind the wire and a mounting device disposed at the door trim and configured to be engaged or disengaged from the door panel of the vehicle by winding or unwinding of the wire. The mounting device includes a guide lever including an insertion hole and a guide groove extending radially from the insertion hole and a guide block slidably coupled to the guide groove and configured to be engaged with or disengaged from the door panel along a sliding direction.

11 Claims, 14 Drawing Sheets

(56) References Cited

U.S. PATENT DOCUMENTS

| | | |
|---|---|---|
| 8,277,401 B2 | 10/2012 | Hammerslag et al. |
| 2013/0111816 A1* | 5/2013 | Kinoshita ............. E05F 11/382<br>49/376 |
| 2016/0031385 A1* | 2/2016 | Lee .................... B60R 13/0206<br>24/289 |

* cited by examiner

DOOR TRIM COUPLING DEVICE FOR A VEHICLE

CROSS-REFERENCE TO RELATED APPLICATION

The present application claims priority to Korean Patent Application No. 10-2016-0172939, filed on Dec. 16, 2016, the entire contents of which is incorporated herein for all purposes by this reference.

BACKGROUND OF THE INVENTION

Field of the Invention

The present invention relates to a door trim coupling device for a vehicle with improved assemblability and detachability using wires.

Discussion of Related Art

Generally, the door trim, which is internal of a vehicle door, provides a pleasant internal space and protects the components. and can be coupled to the inside of the door internal panel.

Conventionally, the door trim can be coupled to the door internal panel using a fastener. Specifically, the fastener was mounted on the door trim, and such a fastener was inserted into the insertion hole provided in the door internal panel, so that the door trim may be coupled to the door internal panel. A physical load had to be applied to insert the fastener into the insertion hole, and the fastener was shrink-fitted into the insertion hole by the physical load.

According to the above-described conventional structure, the insertion force required to insert the fastener into the insertion hole is large, and the assemblability is poor.

Further, to detach the door trim from the door internal panel, the fastener that had been shrink-fitted into the insertion hole had to be pulled out from the insertion hole by physical load. The physical load, that is, the detachment force, is much greater than the insertion force, and the detachability is very poor.

In addition, during the detachment of the door trim, deformation of the fastener and the door internal panel occurs, which necessitates replacement of the fastener or rework of the internal panel.

The information disclosed in this Background of the Invention section is only for enhancement of understanding of the general background of the invention and should not be taken as an acknowledgement or any form of suggestion that this information forms the prior art already known to a person skilled in the art.

BRIEF SUMMARY

Various aspects of the present invention are directed to providing a door trim coupling device for a vehicle with improved assemblability and detachability.

Various aspects of the present invention are directed to providing a door trim coupling device for a vehicle designed to prevent deformation of a door internal panel when a door trim is detached.

In accordance with one aspect of the present invention, a door trim coupling device for a vehicle including a wire provided in a closed loop form, a locking device disposed in a door trim of the vehicle, the locking device being provided to selectively wind or unwind the wire, a mounting device disposed at the door trim and configured to be engaged or disengaged from the door panel of the vehicle by winding or unwinding of the wire, wherein the mounting device includes a guide lever including an insertion hole and a guide groove extending radially from the insertion hole and a guide block slidably coupled to the guide groove and configured to be engaged with or disengaged from the door panel along a sliding direction.

The guide groove may include a plurality of guide grooves spaced apart in the circumferential direction of the insertion hole.

The guide block may include a plurality of guide blocks slidably coupled to the plurality of guide grooves respectively.

The guide lever may include a wire guide to which the wire passes.

The wire may include a first wire and a second wire, each of which forms a separate closed loop and is configured to pass through the wire guide, respectively.

When the first wire is wound, the guide lever may rotate in the first direction, and when the second wire is wound, the guide lever may be rotated in a second direction opposite to the first direction.

When the guide lever rotates in the first direction, the guide block may slide toward the insertion hole to engage with the door panel, and when the guide lever is rotated in the second direction, the guide block may slide away from the insertion hole and is disengaged from the door panel.

The guide block may include a guide protrusion inserted into the guide groove and slidable along the guide groove.

The guide block may include a rail protrusion and a rail groove provided on a rear surface of the rail protrusion.

The plurality of guide blocks may include a first guide block and a second guide block disposed adjacent to the first guide block, the rail protrusion of the first guide block may be slidably engaged with the rail groove of the second guide block.

The mounting device may comprise a case configured to receive the guide lever and the guide block and to prevent the guide block from separating the guide lever.

The methods and apparatuses of the present invention have other features and advantages which will be apparent from or are set forth in more detail in the accompanying drawings, which are incorporated herein, and the following Detailed Description, which together serve to explain certain principles of the present invention.

Figure 1:
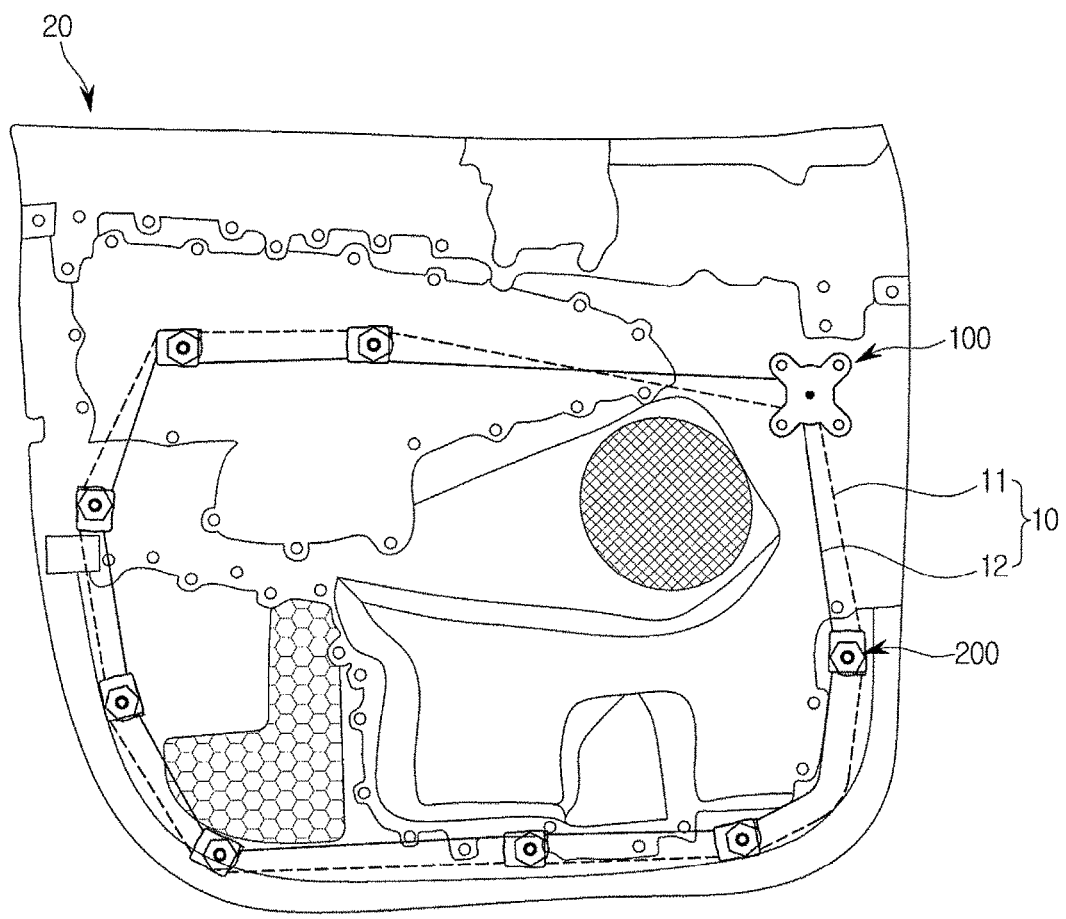
FIG. 1 is a view depicting a state in which a door trim coupling device for a vehicle according to an exemplary embodiment of the present invention is mounted on a door trim of a vehicle.

It may be understood that the appended drawings are not necessarily to scale, presenting a somewhat simplified representation of various features illustrative of the certain principles of the invention. The specific design features of the present invention as included herein, including, for example, specific dimensions, orientations, locations, and shapes will be determined in part by the particular intended application and use environment.

In the figures, reference numbers refer to the same or equivalent parts of the present invention throughout the several figures of the drawing.

DETAILED DESCRIPTION OF EXEMPLARY EMBODIMENTS

Reference will now be made in detail to various embodiments of the present invention(s), examples of which are illustrated in the accompanying drawings and described below. While the invention(s) will be described in conjunction with exemplary embodiments, it will be understood that the present description is not intended to limit the invention(s) to those exemplary embodiments. On the contrary, the invention(s) is intended to cover not only the exemplary embodiments, but also various alternatives, modifications, equivalents and other embodiments, which may be included within the spirit and scope of the invention as defined by the appended claims.

In addition, the same reference numerals or symbols shown in the drawings of the present specification indicate components or components that perform substantially the same function.

Also, the terms used herein are used to illustrate the embodiments and are not intended to limit and/or limit the disclosed invention. The singular forms "a," "an," and "the" include plural referents unless the context clearly dictates otherwise.

In the present specification, the terms "comprise", "having", and the like are used to specify that a feature, a number, a step, an operation, an element, a component, or a combination thereof, But do not preclude the presence or addition of one or more features, integers, steps, operations, elements, components, or combinations thereof.

It is also to be understood that terms including ordinals including "first", "second" and the like used herein may be used to describe various elements, but the elements are not limited to the terms, it is used only for distinguishing one component from another. For example, the first component may be referred to as a second component, and similarly, the second component may also be referred to as a first component. The term "and/or" includes any combination of a plurality of related listed items or any of the plurality of related listed items.

The terms "front", "rear", "upper" and "lower" used in the following description are defined based on the drawings, and the shape and position of each component are not limited by these terms.

In the following description, a vehicle refers to various devices that move a vehicle body including a human being, a thing, or an animal, from a departure point to a destination. Vehicles may include vehicles that run on roads or tracks, ships that move over the sea or river, and airplanes that fly through the sky using air.

Further, a vehicle running on a road or a track can move in a predetermined direction in accordance with the rotation of at least one wheel, and can include a three-wheeled or four-wheeled vehicle, a construction machine, a two-wheeled vehicle, a prime mover, bicycles and trains running on the track.

Hereinafter, embodiments according to an exemplary embodiment of the present invention will be described in detail with reference to the accompanying drawings.

Figure 2:
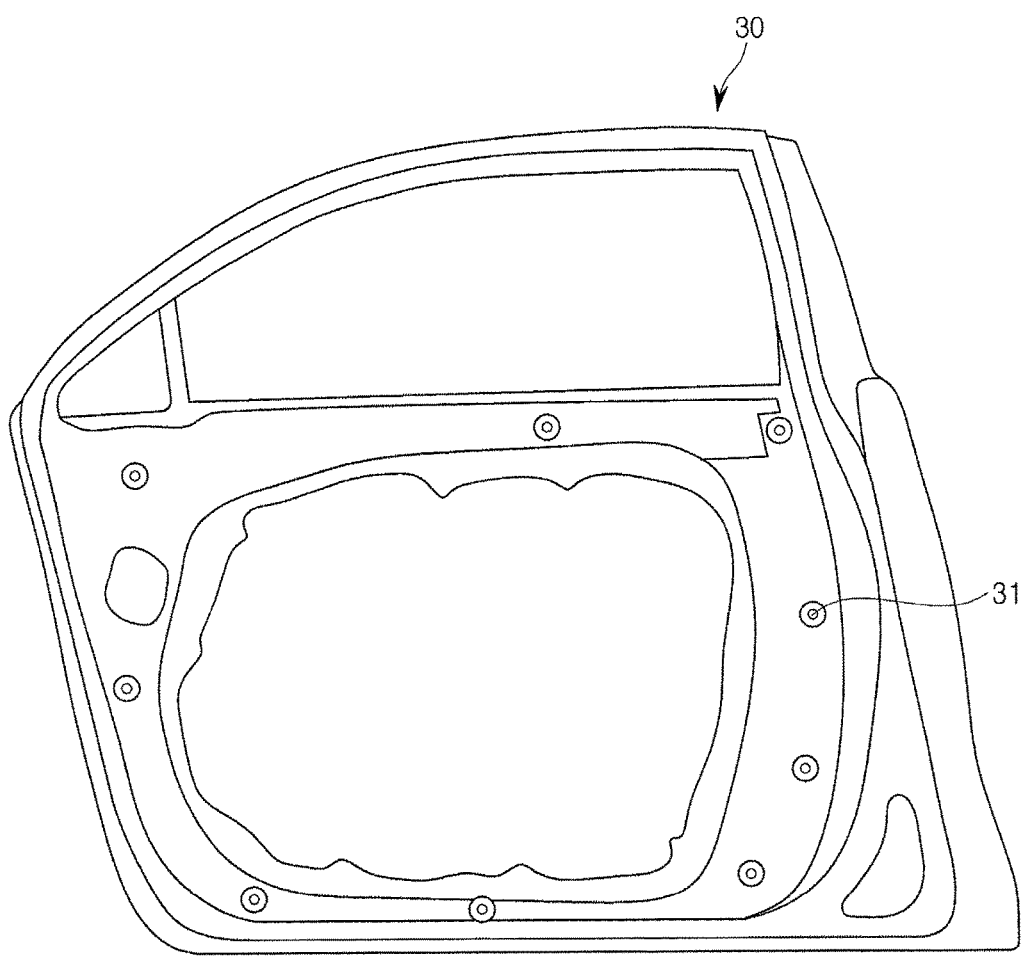
FIG. 2 is a view depicting a door panel of a vehicle according to an exemplary embodiment of the present invention.

As shown in FIG. 1 and FIG. 2, the door trim coupling device for a vehicle according to an exemplary embodiment of the present invention includes a wire 10 provided in a closed loop form, a locking device 100 disposed on the door trim 20 and configured to wind or unwind the wire 10, and a mounting device 200 disposed on the door trim 20 and configured to be engaged or disengaged from the door panel 30 of the vehicle by winding or unwinding of the wire 10.

The wire 10 may include a first wire 11 and a second wire 12, each of which forms a separate closed loop. The first wire 11 and the second wire 12 may connect between the locking device 100 and the mounting device 200. In other words, the locking device 100 and the mounting device 200 can be connected by the wire 10.

The locking device 100 may be disposed at one side of the door trim 20. The locking device 100 may be provided to wind or unwind the first wire 11 or the second wire 12. The locking device 100 can adjust the length of the closed loop formed by the first wire 11 and the second wire 12, respectively. More specifically, when the locking device 100 winds the first wire 11, the first wire 11 is wound on a pulley provided in the locking device 100, the length of the closed loop of the first wire 11 is shortened. Conversely, when the locking device 100 winds the second wire 12, the second wire 12 is wound on a pulley provided in the locking device 100, the length of the closed loop of the second wire 12 is shortened. When the first wire 11 is wound on the pulley of the locking device 100, the second wire 12 is unwounded from the pulley. Similarly, when the second wire 12 is wound on the pulley of the locking device 100, the first wire 11 is unwounded from the pulley. The closed loop may mean the length of the first wire 11 and the second wire 12 with respect to the locking device 100.

The mounting device 200 may be disposed in the door trim 20. The mounting device 200 may be provided in plurality along the rim portion of the door trim 20. When the number of the mounting units 200 is increased, the coupling force between the door trim 20 and the door panel 30 can be increased.

The mounting device 200 may be provided to be engaged or disengaged with the door panel 30 of the vehicle by winding or unwinding of the wire 10. when the first wire 11 is wound on the locking device 100, the mounting device 200 may be provided to engage with the bolt 31 provided on the door panel 30. Conversely, when the second wire 12 is wound on the locking device 100, the mounting device 200 may be provided to be disengaged from the bolt 31.

Therefore, according to the exemplary embodiment of the present invention, the first wire 11 and the second wire 12 can be wound or unwound through the locking device 100, whereby the closed loop length of the first wire 11 and the closed loop length of the second wire 12 can be adjusted. The mounting device 200 can be engaged or disengaged with the door panel 30 by adjusting the closed loop length of the first wire 11 or the second wire 12.

That is, only by operating the locking device 100, the mounting device 200 can be easily coupled with the door panel 30, and the mounting device 200 and the door panel 30 can be disengaged. Therefore, the insertability and detachability can be significantly improved as compared with the method of joining the door panel with the door trim through the fastener. Further, there is no fear that the door panel 30 is broken in a process of joining or disengaging the mounting device 200 and the door panel 30. Therefore, it is possible to prevent the occurrence of door panel breakage and the occurrence of rework due to detachment of the door trim.

Figure 3:
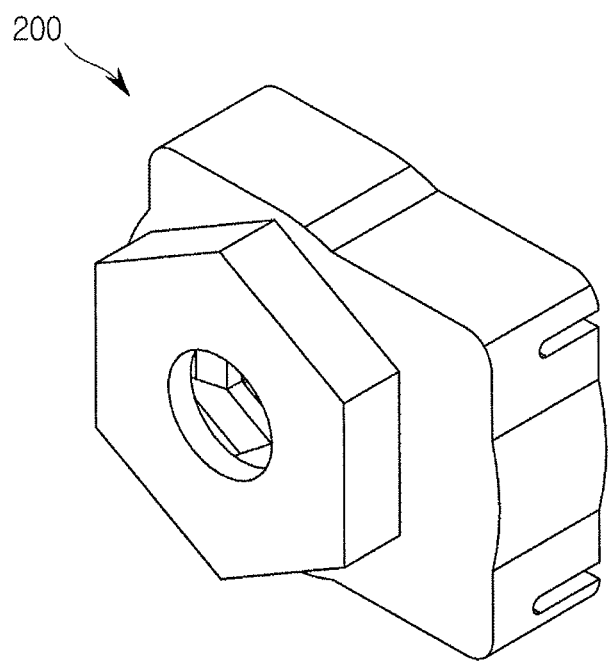
FIG. 3 is a view depicting a mounting device in a door trim coupling device for a vehicle according to an exemplary embodiment of the present invention.
Figure 4:
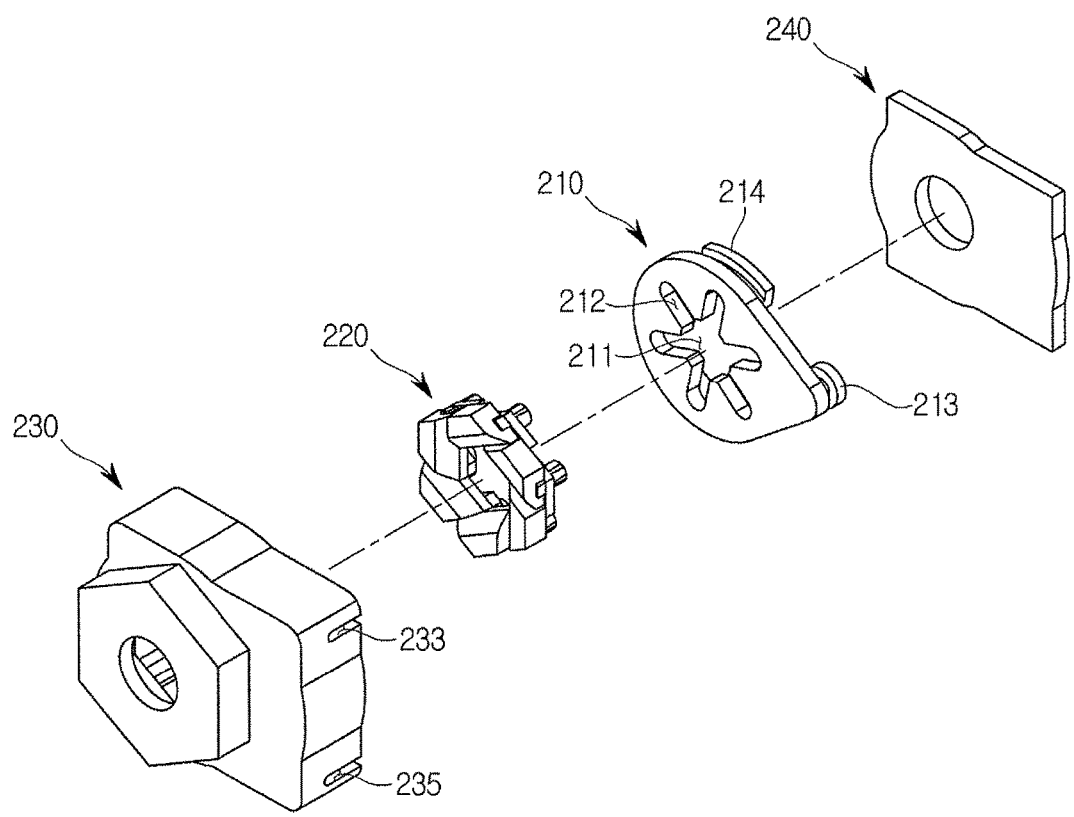
FIG. 4 is an exploded view of the mounting device shown in FIG. 3.

FIG. 3 is a view depicting a mounting device in a door trim coupling device for a vehicle according to an exemplary embodiment of the present invention. FIG. 4 is an exploded view of the mounting device shown in FIG. 3 and FIG. 5 is a view depicting the mounting device shown in FIG. 4 from another angle.

Hereinafter, the mounting device of the present invention will be described in detail with reference to FIG. 3 to FIG. 5.

Figure 5:
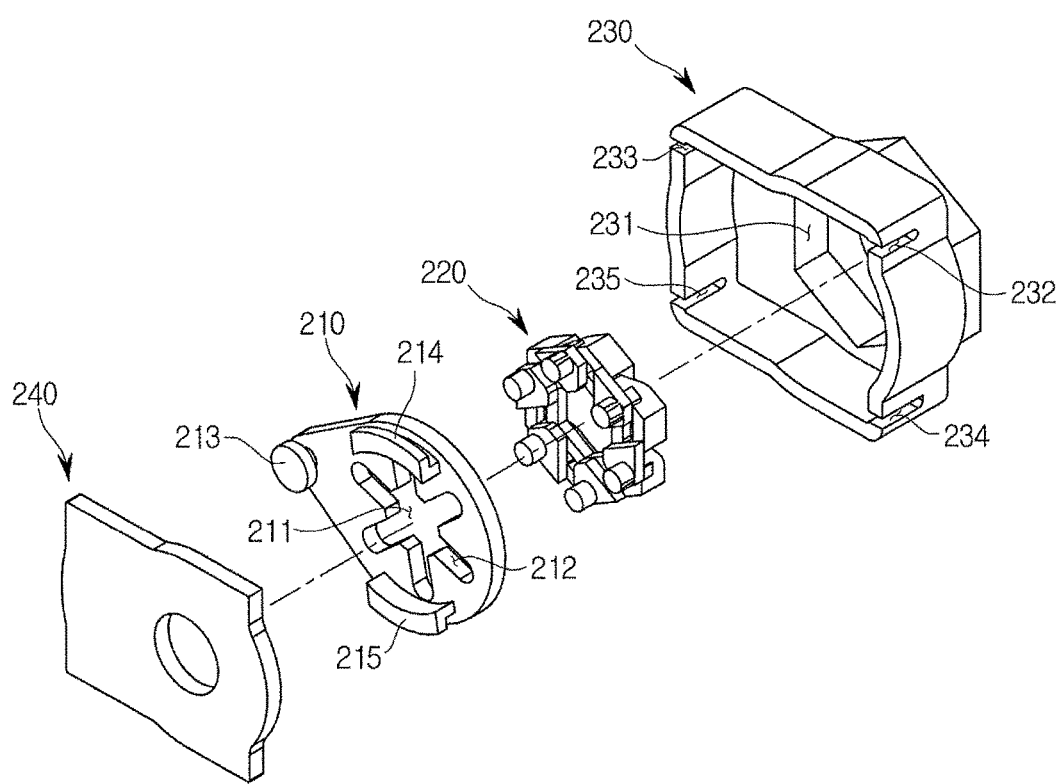
FIG. 5 is a view depicting the mounting device shown in FIG. 4 from another angle.

As shown in FIG. 3 and FIG. 5, the mounting device 200 may include a guide lever 210, a guide block 220, a case 230 and a cover 240.

The guide lever 210 may include an insertion hole 211 and a guide groove 212 extending from the insertion hole 211 in the radial direction of the insertion hole 211.

The guide groove 212 may include a plurality of guide grooves 212. For example, the guide groove 212 may include a plurality of guide grooves 212 spaced in the circumferential direction of the insertion hole 211. In other words, the plurality of guide grooves 212 may be provided in a spoke shape. Alternatively, the plurality of guide grooves 212 may be radially provided. according to an exemplary embodiment of the present invention, the plurality of guide grooves 212 may include six guide grooves 212 spaced apart each other along the circumferential direction of the insertion hole 211. However, this is merely an example, and the number of the guide grooves 212 can be changed according to design matters.

The guide lever 210 may include a wire guide 213 provided for the wire 10 to pass and wire supports 214 and 215 provided to support the wire 10.

The guide block 220 may be slidably coupled to the guide groove 212. The guide block 220 may include a plurality of guide blocks 220. The plurality of guide blocks 220 may be slidably coupled to each of the plurality of guide grooves 212.

According to an exemplary embodiment of the present invention, since six guide grooves 212 may be provided, a plurality of guide blocks 220 may also be provided by six. As described above, the number of the guide grooves 212 and the guide blocks 220 can be changed according to design matters.

The guide block 220 may be provided to be engaged or disengaged with the door panel 30 along the direction of sliding along the guide groove 212. The door panel 30 may be provided with a plurality of bolts 31 (see FIG. 8). The bolt 31 may be provided to pass through the insertion hole 211. That is, the external diameter of the bolt 31 may be smaller than the internal diameter of the insertion hole 211.

The plurality of guide blocks 220 can be slidably coupled to the plurality of guide grooves 210 radially extending from the insertion holes 211. When the guide block 220 slides toward the insertion hole 211, the guide block 220 can engage with the bolt 31 of the door panel 30. Conversely, when the guide block 220 slides away from the insertion hole 211, the guide block 220 can be disengaged from the bolt 31 of the door panel 30.

The case 230 may be provided to receive the guide lever 210 and the guide block 220 and prevent the guide block 220 from being separated from the guide lever 210.

The case 230 may include a separation preventing groove 231 that is provided to prevent the guide block 220 from being separated from the guide lever 210.

The separation preventing groove 231 may correspond to the shape of the guide block 220 when it is maximally moved radially outward of the insertion hole 211. According to the present embodiment, when the distance between the guide block 220 and the insertion hole 211 is maximum, the guide block 220 has a hexagonal shape on its external edge portion, so that the separation preventing groove 231 may be provided in a hexagonal shape.

The case 230 may include a plurality of holes 232, 233, 234, and 235, through which the wire 10 passes. This will be described later.

The cover 240 may cover the rear surface of the case 230 to receive the guide lever 210 and the guide block 220 together with the case 230.

Figure 6A:
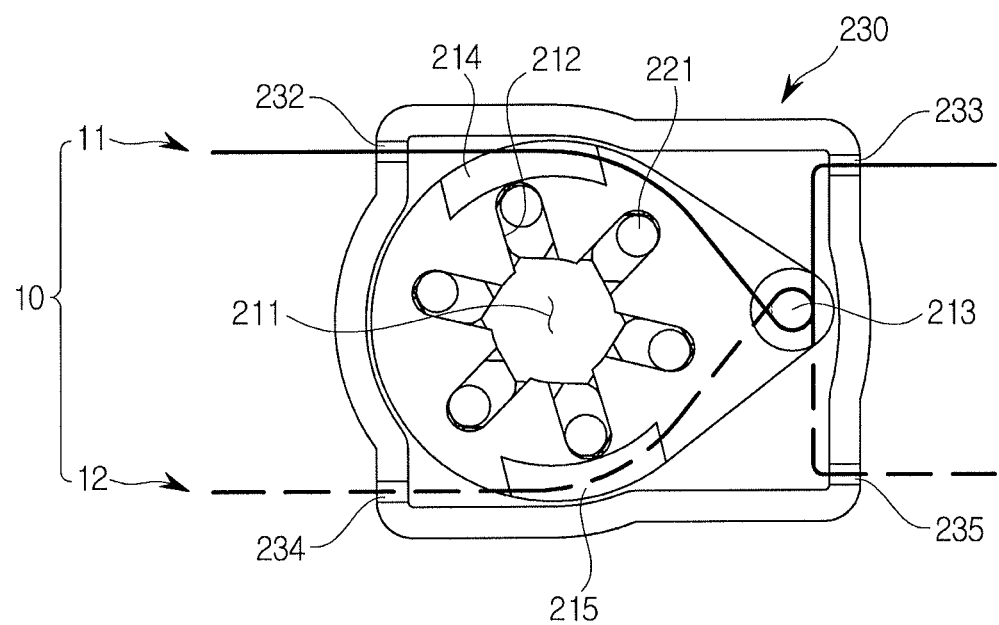
FIG. 6A and FIG. 6B are views depicting an operation of a mounting device in a door trim coupling device for a vehicle according to an exemplary embodiment of the present invention.
Figure 6B:
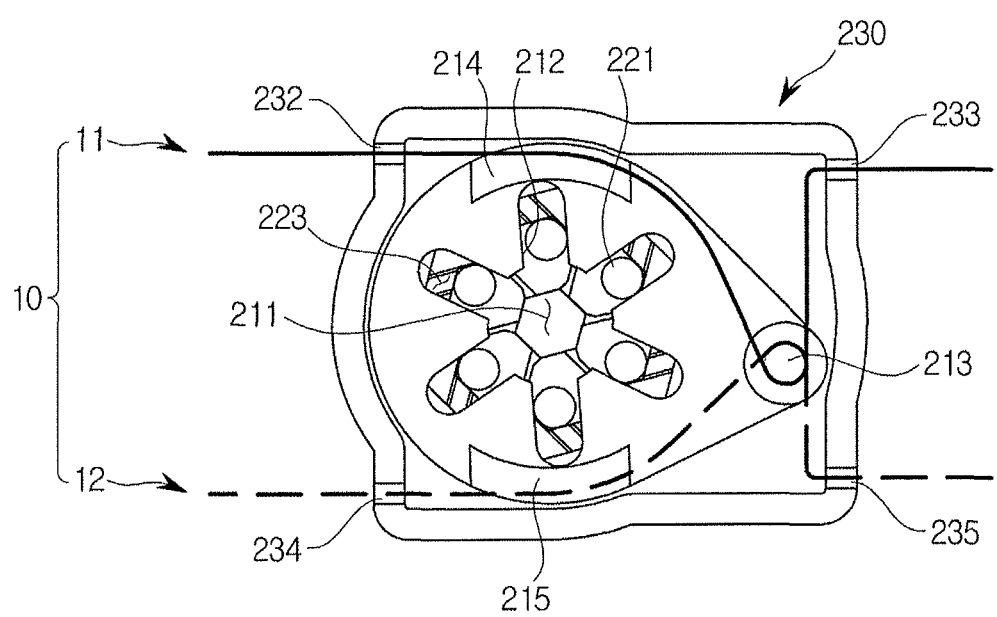
Figure 7A:
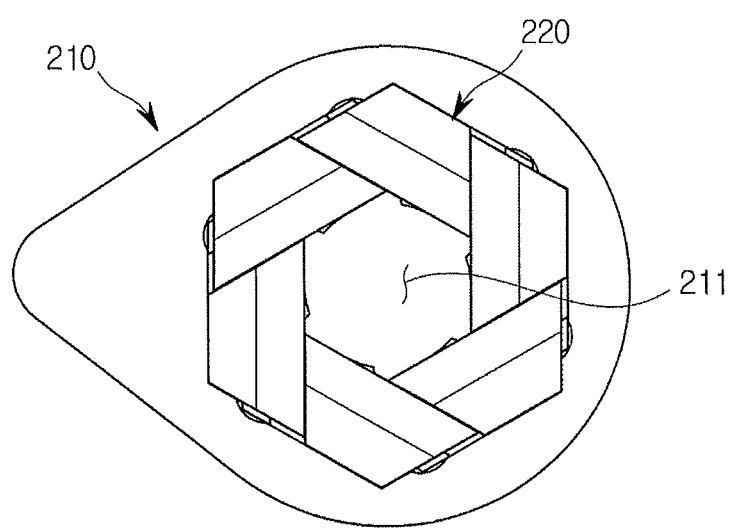
FIG. 7A and FIG. 7B are views depicting a guide lever and a guide block in a door trim coupling device for a vehicle according to an exemplary embodiment of the present invention.
Figure 7B:
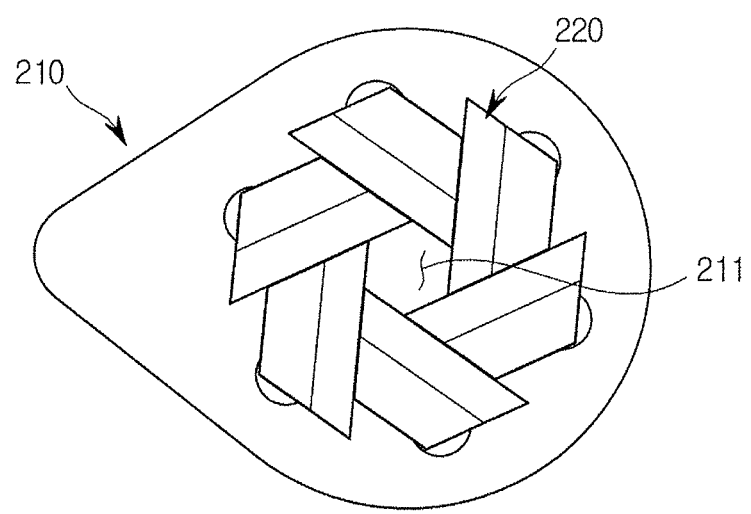

FIG. 6A and FIG. 6B are views depicting an operation of a mounting device in a door trim coupling device for a vehicle according to an exemplary embodiment of the present invention and FIG. 7A and FIG. 7B are views depicting a guide lever and a guide block in a door trim coupling device for a vehicle according to an exemplary embodiment of the present invention.

Hereinafter, the operation of the guide block will be described in detail with reference to FIG. 6A to FIG. 7B.

As shown in FIG. 6A, 6B and FIG. 7A, 7B, when the guide block 220 slides toward the insertion hole 211, the size of the insertion hole 211 is reduced due to the guide block 220.

When the guide block 220 slides away from the insertion hole 211, that is, when the guide block 220 slides radially outward of the insertion hole 211, the guide block 220 does not limit the size of the insertion hole 211. As a result, the size of the insertion hole 211 becomes relatively large.

According to the exemplary embodiment of the present invention, the guide lever 210 can be rotated using the wire 10. The guide block 220 can be slid toward the insertion hole 211 or can be slid away from the insertion hole 211 by rotating the guide lever 210.

The guide lever 210 may include a wire guide 213 to which the wire 10 passes. The wire guide 213 may be provided in a pulley shape so that the wire 10 can pass through.

The wire 10 may form a closed loop. The wire 10 may include a first wire 11 and a second wire 12, each of which forms a separate closed loop. The first wire 11 and the second wire 12 can pass through the wire guide 213, respectively. The first wire 11 can be supported by the first wire support 214, and the second wire 12 can be supported by the second wire support 215.

As shown in FIG. 6A, the first wire 11 is supported by the first wire support 214 and can pass through the lower end portion of the wire guide 213. The second wire 12 is supported by the second wire support 215 and can pass through the upper end portion of the wire guide 213.

The case 230 may include a plurality of holes through which the wire 10 passes. the case 230 may include a first upper hole 232 and a second upper hole 233, through which the first wire 11 may pass. The case 230 may include a first lower hole 234 and a second lower hole 235, through which the second wire 12 passes.

The first wire 11 passes through the first upper hole 232 and is supported by the first wire support 214, and the first wire 11 passes through the lower end portion of the wire guide 213 and then passes through the second upper hole 233.

The second wire 12 passes through the first lower hole 234 and is supported by the second wire support 215 and the second wire 12 passes through the upper end portion of the wire guide 213 and then passes through the second lower hole 235.

When the first wire 11 is wound by the locking device 100, the guide lever 210 rotates in the first direction and when the second wire 12 is wound by the locking device 100, the guide lever 210 can rotate in a second direction opposite to the first direction. According to the present exemplary embodiment, the first direction may be a counterclockwise direction and the second direction may be a clockwise direction.

When the guide lever 210 rotates in the first direction, the guide block 210 can slide away from the insertion hole 211. Conversely, when the guide lever 210 rotates in the second direction, the guide block 210 can slide toward the insertion hole 211.

That is, by adjusting each of the closed loop length of the first wire 11 and the closed loop length of the second wire 12 connected to the mounting device 200, the guide block 220 slides along the guide groove 212, So that the size of the insertion hole 211 can be increased or decreased. Through this operation, the mounting device 200 can be engaged with or disengaged from the door panel 30.

As shown in FIGS. 6A and 6B, the guide block 220 may include a guide protrusion 221 configured to slide along the guide groove 212.

The guide protrusion 221 may be provided in a substantially cylindrical shape. The guide protrusion 221 is inserted into the guide groove 212 and can slide along the guide groove 212. The guide protrusion 221 slides along the guide groove 212 so that the guide block 220 can slide along the guide groove 212 together with the guide protrusion 221.

Figure 8:
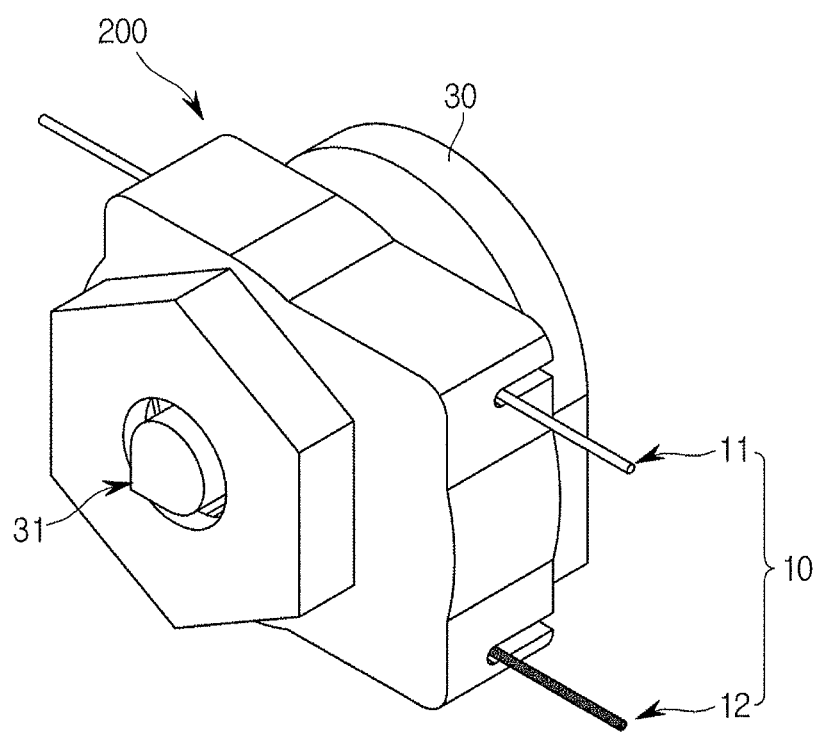
FIG. 8 is a view depicting a portion of a mounting device and a door panel in a door trim coupling device for a vehicle according to an exemplary embodiment of the present invention.
Figure 9:
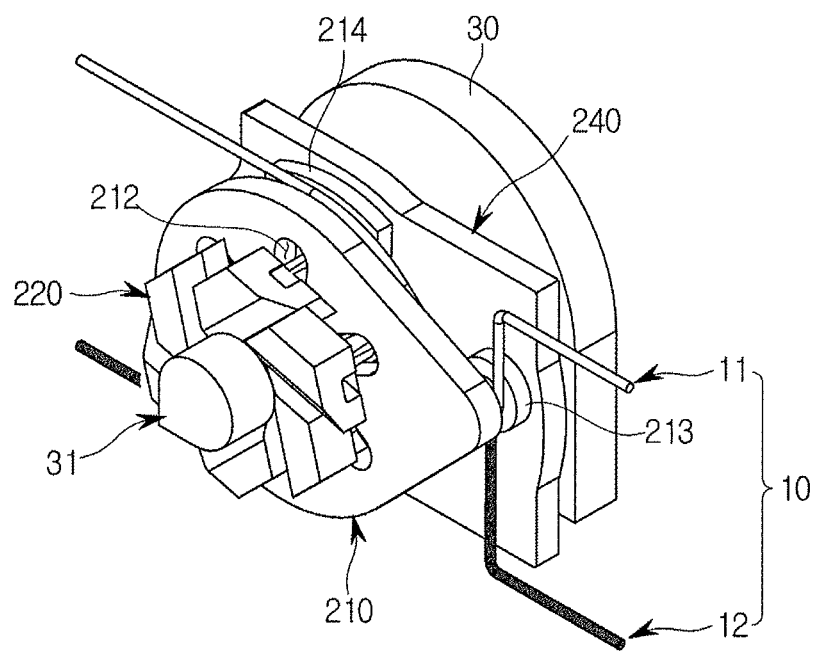
FIG. 9 is a view depicting a state in which a mounting device and a door panel are combined in a door trim coupling device for a vehicle according to an exemplary embodiment of the present invention.
Figure 10:
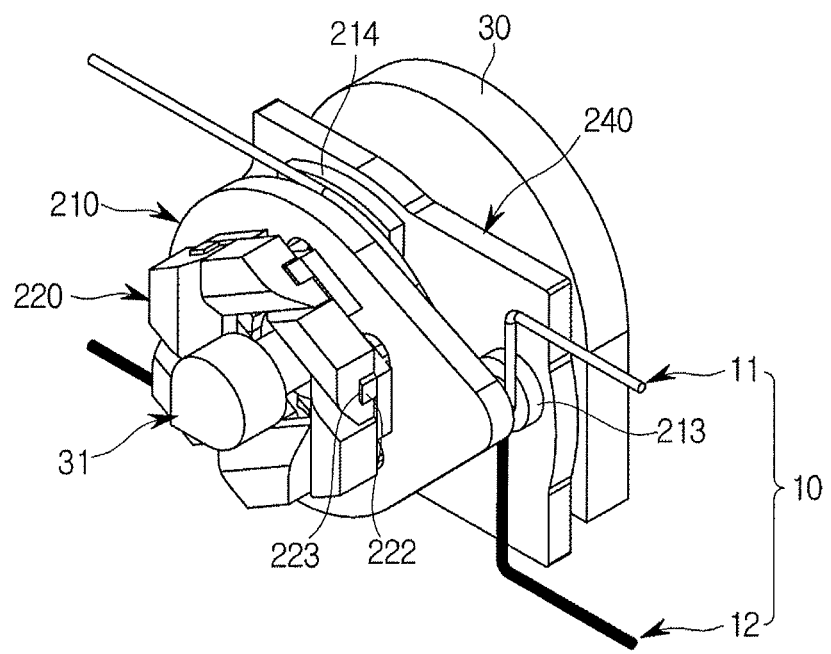
FIG. 10 is a view depicting a state in which a mounting device and a door panel are disengaged in a door trim coupling device for a vehicle according to an exemplary embodiment of the present invention.

FIG. 8 is a view depicting a portion of a mounting device and a door panel in a door trim coupling device for a vehicle according to an exemplary embodiment of the present invention. FIG. 9 is a view depicting a state in which a mounting device and a door panel are combined in a door trim coupling device for a vehicle according to an exemplary embodiment of the present invention and FIG. 10 is a view depicting a state in which a mounting device and a door panel are disengaged in a door trim coupling device for a vehicle according to an exemplary embodiment of the present invention;

As shown in FIG. 8, the door panel 30 may include a bolt 31 protruding from the door panel 30. The door panel 30 of FIG. 8 shows a portion of the door panel 30 for convenience of explanation.

The mounting device 200 can be engaged with or disengaged from the bolt 31. Since the insertion hole 211 is sufficiently large for the bolt 31 to pass therethrough, the bolt 31 can freely pass through the insertion hole 211 when the size of the insertion hole 211 is not reduced by the guide block 220. Each of the closed loop length of the first wire 11 and the closed loop length of the second wire 12 is adjusted through the locking device 100 so that the guide lever 210 of the mounting device 200 is rotated in one direction or the other direction and the guide block 220 can adjust the size of the insertion hole 211.

When the guide block 220 slides along the guide groove 212 by the rotation of the guide lever 210 to reduce the size of the insertion hole 211, the bolt 31 cannot pass through the insertion hole 211. That is, the mounting device 100 and the bolt 31 are engaged. When the guide lever 210 is continuously rotated in the direction of reducing the size of the insertion hole 211, the force of tightening the bolt 31 by the plurality of guide blocks 220 becomes strong. Accordingly, the coupling force between the mounting device 100 and the bolt 31 can be strengthened.

Conversely, when the guide block 220 slides along the guide groove 212 by the rotation of the guide lever 210 to increase the size of the insertion hole 211, the bolt 31 can pass through the insertion hole 211 again. That is, the engagement between the mounting device 100 and the bolt 31 is released.

The above process is shown in detail in FIG. 9 and FIG. 10. As shown in FIG. 9, when the guide block 220 reduces the size of the insertion hole, the mounting device 200 and the door panel 30 are engaged. As shown in FIG. 10, when the guide block 220 increases the size of the insertion hole, the engagement of the mounting device 200 and the door panel 30 can be released.

Figure 11A:
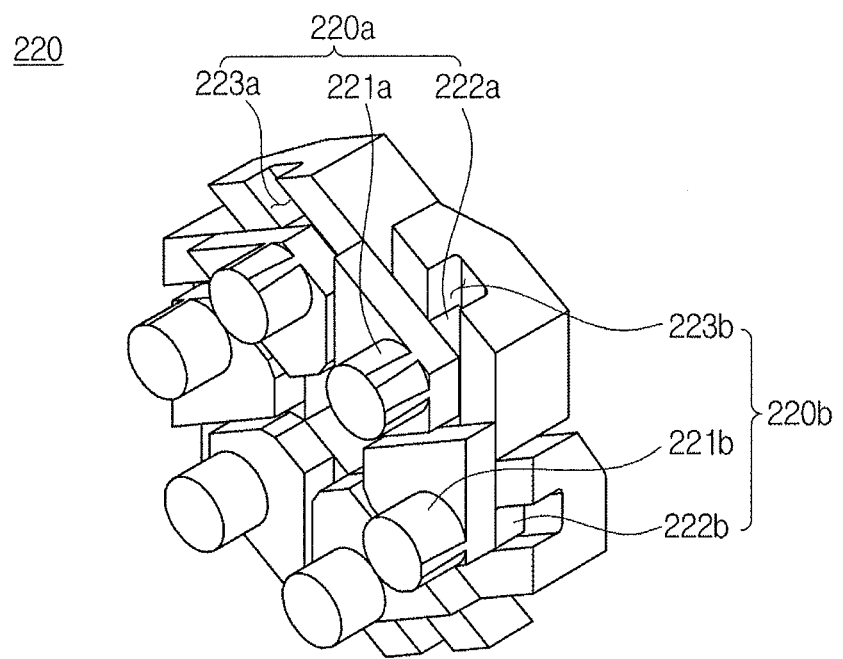
FIG. 11A and FIG. 11B are views depicting a coupling relationship of a guide block in a door trim coupling device for a vehicle according to an exemplary embodiment of the present invention.
Figure 11B:
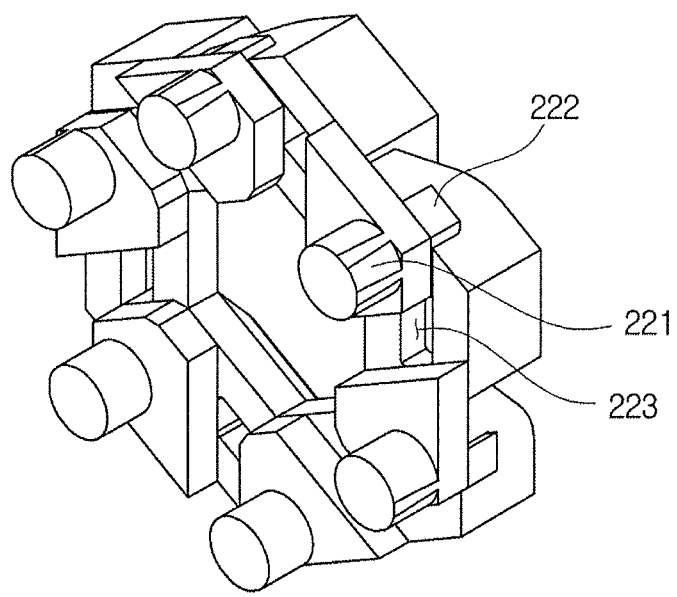

FIG. 11A and FIG. 11B are views depicting a coupling relationship of a guide block in a door trim coupling device for a vehicle according to an exemplary embodiment of the present invention.

As shown in FIGS. 11A and 11B, the guide block 220 may include guide protrusions 221 and rail protrusions 222 and rail grooves 223 provided on the rear surfaces of the rail protrusions 222.

The rail protrusion 222 may be provided on the rear surface of the guide protrusion 221. That is, the rail groove 223 and the guide protrusion 221 may be provided on one side of the guide block 220, and the rail protrusion 222 may be provided on the other side opposite to the one side.

The guide block 220 may include a plurality of guide blocks 220. In the instant case, the guide block 220 may include a first guide block 220a and a second guide block 220b disposed adjacent to the first guide block 220a.

The rail protrusion 222a of the first guide block 220a can be slidably engaged with the rail groove 223b of the second guide block 220b. Similarly, each of the plurality of guide blocks 220 can slidably engage with guide blocks 220 disposed adjacent to each other.

The plurality of guide blocks 220 slides together without sliding along the guide grooves 212 separately by the rotation of the guide lever 210. When the guide lever 210 rotates in a direction to engage with the door panel 30, the guide block 220 can provide a constant force to the bolt 31 of the door panel 30 in all directions. That is, the force by which the guide block 220 tightens the bolt 31 is not shifted from the center of the insertion hole 211. Therefore, when the mounting device 200 and the door panel 30 are engaged, it is possible to prevent the bolt portion 31 of the door panel 30 from being bent or broken.

For convenience in explanation and accurate definition in the appended claims, the terms "upper", "lower", "internal", "outer", "up", "down", "upper", "lower", "upwards", "downwards", "front", "rear", "back", "inside", "outside", "inwardly", "outwardly", "internal", "external", "internal", "outer", "forwards", and "backwards" are used to describe features of the exemplary embodiments with reference to the positions of such features as displayed in the figures.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described in order to explain certain principles of the invention and their practical application, to thereby enable others skilled in the art to make and utilize various exemplary embodiments of the present invention, as well as various alternatives and modifications thereof. It is intended that the scope of the invention be defined by the Claims appended hereto and their equivalents.

What is claimed is:

1. A door trim coupling device for a vehicle comprising:
a wire provided in a closed loop form;
a locking device disposed in a door trim of the vehicle, the locking device being provided to selectively wind or unwind the wire;
a mounting device disposed at the door trim and configured to be engaged or disengaged from a door panel of the vehicle by winding or unwinding of the wire;
wherein the mounting device includes:
a guide lever including an insertion hole and a guide groove extending radially from the insertion hole; and
a guide block slidably coupled to the guide groove and configured to be engaged with or disengaged from the door panel along a sliding direction.

2. The door trim coupling device for the vehicle according to claim 1, wherein the guide groove includes a plurality of guide grooves spaced apart in a circumferential direction of the insertion hole.

3. The door trim coupling device for the vehicle according to claim 2, wherein the guide block includes a plurality of guide blocks slidably coupled to the plurality of guide grooves respectively.

4. The door trim coupling device for the vehicle according to claim 1, wherein the guide lever includes a wire guide to which the wire is configured to pass.

5. The door trim coupling device for the vehicle according to claim 4, wherein the wire includes a first wire and a second wire, each of which forms a separate closed loop and is configured to pass through the wire guide, respectively.

6. The door trim coupling device for the vehicle according to claim 5, wherein when the first wire is configured to be wound, the guide lever rotates in a first direction, and when the second wire is configured to be wound, the guide lever is rotated in a second direction opposite to the first direction.

7. The door trim coupling device for the vehicle according to claim 6, wherein when the guide lever rotates in the first direction, the guide block slides toward the insertion hole to engage with the door panel, and when the guide lever is rotated in the second direction, the guide block slides away from the insertion hole and is disengaged from the door panel.

8. The door trim coupling device for the vehicle according to claim 1, wherein the guide block includes a guide protrusion inserted into the guide groove and slidable along the guide groove.

9. The door trim coupling device for the vehicle according to claim 3, wherein the guide block includes a rail protrusion and a rail groove provided on a rear surface of the rail protrusion.

10. The door trim coupling device for the vehicle according to claim 9, wherein the plurality of guide blocks include a first guide block and a second guide block disposed adjacent to the first guide block, and the rail protrusion of the first guide block is slidably engaged with the rail groove of the second guide block.

11. The door trim coupling device for the vehicle according to claim 1, wherein the mounting device further includes a case configured to receive the guide lever and the guide block and to prevent the guide block from separating the guide lever.

* * * * *